US009528409B2

(12) United States Patent
Aso et al.

(10) Patent No.: US 9,528,409 B2
(45) Date of Patent: Dec. 27, 2016

(54) EXHAUST PURIFICATION DEVICE FOR INTERNAL COMBUSTION ENGINE

(71) Applicant: ISUZU MOTORS LIMITED, Tokyo (JP)

(72) Inventors: Mitsuhiro Aso, Yokohama (JP); Tadashi Uchiyama, Kamakura (JP); Masafumi Noda, Kawasaki (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 14/763,696

(22) PCT Filed: Jan. 15, 2014

(86) PCT No.: PCT/JP2014/050565
§ 371 (c)(1),
(2) Date: Oct. 9, 2015

(87) PCT Pub. No.: WO2014/115621
PCT Pub. Date: Jul. 31, 2014

(65) Prior Publication Data
US 2016/0040573 A1 Feb. 11, 2016

(30) Foreign Application Priority Data

Jan. 28, 2013 (JP) ................................. 2013-013389

(51) Int. Cl.
F01N 3/025 (2006.01)
F01N 13/00 (2010.01)
(Continued)

(52) U.S. Cl.
CPC ............. F01N 3/0256 (2013.01); F01N 3/027 (2013.01); F01N 3/0253 (2013.01); F01N 9/002 (2013.01);
(Continued)

(58) Field of Classification Search
CPC ........ F01N 3/0253; F01N 3/027; F01N 3/031; F01N 2560/12; F01N 2900/1606
See application file for complete search history.

(56) References Cited

U.S. PATENT DOCUMENTS

2004/0187477 A1* 9/2004 Okugawa ................ F01N 3/023
60/277
2008/0028752 A1* 2/2008 Lee .......................... F01N 9/002
60/295

(Continued)

FOREIGN PATENT DOCUMENTS

EP 2 390 480 A1 11/2011
JP 2002-21537 1/2002
(Continued)

OTHER PUBLICATIONS

Machine translation of JP 2012-246830 A, accessed Mar. 4, 2016.*
(Continued)

Primary Examiner — Jonathan Matthias
(74) Attorney, Agent, or Firm — Staas & Halsey LLP

(57) ABSTRACT

An exhaust gas purification device for an internal combustion engine, wherein an amount of fuel supply during a forced regeneration is optimized, and a fuel efficiency is effectively improved. The device includes a filter in an exhaust passage of the internal combustion engine for collecting particulate matter in an exhaust gas, an electrostatic capacity detecting unit that detects an electrostatic capacity of the filter, and a filter regenerating unit that supplies fuel to the filter and executes a forced regeneration to burn and remove the particulate matter in the filter. The filter regenerating unit stops supplying fuel when a rate of decrease in the detected electrostatic capacity per predetermined period of time reaches or falls below a predetermined lower threshold, which indicates a drop in burning efficiency of the (Continued)

particulate matter, while the forced regeneration is being executed.

8 Claims, 4 Drawing Sheets

(51) Int. Cl.
    *F01N 3/027*     (2006.01)
    *F01N 9/00*     (2006.01)
    *B01D 46/00*     (2006.01)

(52) U.S. Cl.
    CPC ........... *F01N 13/008* (2013.01); *B01D 46/006* (2013.01); *B01D 2279/30* (2013.01); *F01N 2560/12* (2013.01); *F01N 2610/03* (2013.01); *F01N 2900/1606* (2013.01)

(56) References Cited

U.S. PATENT DOCUMENTS

| | | | |
|---|---|---|---|
| 2009/0309571 A1 | 12/2009 | Katsuyama et al. | |
| 2010/0126146 A1 | 5/2010 | Yamamoto | |
| 2013/0101471 A1* | 4/2013 | Yacoub | F01N 3/103 422/168 |

FOREIGN PATENT DOCUMENTS

| | | |
|---|---|---|
| JP | 2008-286027 | 11/2008 |
| JP | 2009-97410 | 5/2009 |
| JP | 2011-247145 | 12/2011 |
| JP | 2012-246830 | 12/2012 |
| WO | WO 2008/117853 A1 | 10/2008 |

OTHER PUBLICATIONS

PCT International Preliminary Report on Patentability issued Jul. 28, 2015 in corresponding International Patent Application No. PCT/JP2014/050565.
PCT Written Opinion of the International Searching Authority mailed Mar. 25, 2014 in corresponding International Patent Application No. PCT/JP2014/050565.
Espacenet Bibliographic data, Publication No. WO2008/117853, published Oct. 2, 2008.
Espacenet Bibliographic data, Publication No. 2008-286027, published Nov. 27, 2008.
Espacenet Bibliographic data, Publication No. 2011-247145, published Dec. 8, 2011.
Espacenet Bibliographic data, Publication No. 2002-21537, published Jan. 23, 2002.
Espacenet Bibliographic data, Publication No. 2012-246830, published Dec. 13, 2012.
Espacenet Bibliographic data, Publication No. 2009-97410, published May 7, 2009.
International Search Report mailed Mar. 25, 2014, in corresponding International Patent Application No. PCT/JP2014/050565.
Extended European Search Report dated Aug. 22, 2016 in corresponding European Patent Application No. 14743522.6.

* cited by examiner

EXHAUST PURIFICATION DEVICE FOR INTERNAL COMBUSTION ENGINE

CROSS-REFERENCE TO RELATED APPLICATIONS

This application is a U.S. National Stage Application, which claims the benefit under 35U.S.C. §371 of PCT International Patent Application No. PCT/JP2014/050565, filed Jan. 15, 2014, which claims the foreign priority benefit under 35 U.S.C. §119 of Japanese Patent Application No. 2013-013389, filed Jan. 28, 2013, the contents of which are incorporated herein by reference.

TECHNICAL FIELD

The present invention relates to exhaust purification devices for internal combustion engines, and in particular relates to an exhaust purification device that has a filter for collecting particulate matter in an exhaust gas emitted from an internal combustion engine.

BACKGROUND ART

A diesel particulate filter (hereinafter, referred to as DPF), for example, is known as a filter for collecting particulate matter (hereinafter, referred to as PM) in an exhaust gas emitted from a diesel engine.

The DPF can only collect a limited amount of PM, and therefore a forced regeneration needs to be performed to periodically burn and remove accumulated PM. The forced regeneration is performed by supplying unburned fuel, primarily hydrocarbon ("HC"), to an oxidation catalyst on an upstream side of an exhaust passage by means of in-pipe injection or post-injection, and raising the exhaust gas temperature to a PM-burning temperature with heat produced upon oxidation.

For example, Patent Literature 1 discloses an exhaust gas purification system that performs a forced regeneration by raising the temperature of a DPF by means of post-injection as the pressure difference across the DPF between the upstream side and the downstream side of the exhaust passage reaches or exceeds a predetermined value.

LISTING OF REFERENCES

PATENT LITERATURE 1: Japanese Patent Application Laid-Open Publication(Kokai) No. 2011-247145

As burning of accumulated PM progresses through the forced regeneration, the pressure difference across the DPF between the upstream side and the downstream side of the exhaust passage gradually decreases. Thus, the sensitivity of the remaining PM to the pressure difference is lost in particular during the last stage (phase) of the forced regeneration, and a problem arises, i.e., an accurate amount of accumulated PM in the DPF cannot be grasped.

In order to prevent PM from remaining in the DPF, it is conceivable to set the safety factor with a relatively large margin and increase an amount of fuel supply (extend the duration of fuel supply). This, however, keeps wasting the fuel in the last stage of the forced regeneration, and the fuel efficiency may be reduced.

It is also conceivable to reduce an interval between the end of a forced regeneration and the start of a next forced regeneration (hereinafter, referred to as a regeneration interval) so as to reduce PM accumulation in the DPF. This, however, increases the frequency at which the temperature is raised to a regeneration-possible temperature, and fuel is wasted in raising the temperature. Thus, this may also deteriorate the fuel efficiency.

SUMMARY OF THE INVENTION

The present invention has been made in view of such problems, and an object of the present invention is to optimize an amount of fuel supply during a forced regeneration and to effectively improve the fuel efficiency.

To achieve the above-mentioned object, an exhaust gas purification device for an internal combustion engine according to the present invention includes a filter that is provided in an exhaust passage of the internal combustion engine and is configured to collect particulate matter in an exhaust gas, an electrostatic capacity (capacitance) detecting unit configured to detect an electrostatic capacity (capacitance) of the filter, and a filter regenerating unit configured to supply fuel to the filter to perform a forced regeneration, which burns and removes particulate matter accumulated in the filter. The filter regenerating unit stops supplying the fuel when a rate of decrease in the detected electrostatic capacity per predetermined period of time reaches or falls below a predetermined lower threshold, which indicates a drop in burning efficiency of the particulate matter, while the forced regeneration is being performed.

The filter regenerating unit may stop supplying the fuel after reducing an amount of fuel supply stepwise when the rate of decrease in the detected electrostatic capacity per predetermined period of time reaches or falls below the predetermined lower threshold while the force regeneration is being performed.

The electrostatic capacity detecting unit may include a pair of electrodes that are disposed in the filter so as to oppose each other with at least one partition wall interposed therebetween. The paired electrodes form a capacitor.

The exhaust gas purification device may further include a bypass passage that branches from the exhaust passage at a position upstream of the filter and connects to the exhaust passage at position downstream of the filter so as to bypass the filter, and a second filter that is provided in the bypass passage and collects particulate matter in the exhaust gas flowing through the bypass passage. The paired electrodes may be disposed in the second filter such that the two electrodes oppose each other with at least one partition wall interposed therebetween.

When a forced regeneration of the second filter is performed, the paired electrodes may be used as a heater.

According to the exhaust gas purification device for an internal combustion engine according to the present invention, an amount of fuel supply during a forced regeneration is optimized, and the fuel efficiency is effectively improved.

DETAILED DESCRIPTION

Figure 1:
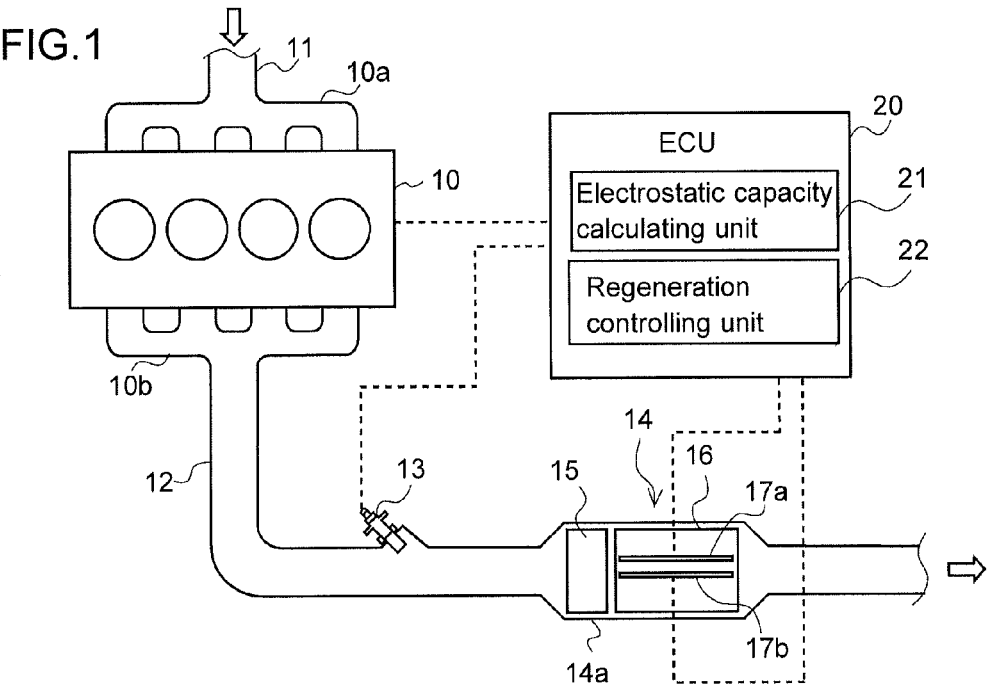
FIG. 1 is an overall configuration diagram schematically illustrating an exhaust gas purification device for an internal combustion engine according to an embodiment of the present invention.

With reference to FIGS. 1 to 4, an exhaust gas purification device for an internal combustion engine according to embodiments of the present invention will be described. Identical parts are given identical reference numerals and signs, and their names and functions are identical as well. Therefore, detailed description of such parts will not be repeated.

As illustrated in FIG. 1, a diesel engine (hereinafter, simply referred to as the engine) 10 includes an intake manifold 10a and an exhaust manifold 10b. An intake passage 11 for introducing fresh air is connected to the intake manifold 10a, and an exhaust passage 12 for discharging exhaust gas to the atmosphere is connected to the exhaust manifold 10b. Furthermore, an in-pipe injection device 13 and an exhaust gas post-treatment device 14 are provided in the exhaust passage 12. The in-pipe injection device 13 is located upstream of the exhaust gas post-treatment device 14 in the exhaust passage.

The in-pipe injection device 13 injects unburned fuel (primarily HC) into the exhaust passage 12 in response to an instruction signal from an engine control unit ("ECU") 20, which will be described later. It should be noted that the in-pipe injection device 13 may be dispensed with if post-injection for carrying out multiple-injection to the engine 10 is used.

The exhaust gas post-treatment device 14 includes an oxidation catalyst 15 and a DPF 16. The oxidation catalyst 15 is located upstream of the DPF 16 in the exhaust passage. The oxidation catalyst 15 and the DPF 16 are disposed in a casing 14a.

The oxidation catalyst 15 is formed, for example, of a catalyst component supported on a surface of a ceramic carrier. The ceramic carrier may have a cordierite honeycomb structure. As unburned fuel (primarily HC) is supplied by the in-pipe injection device 13 or through post-injection, the oxidation catalyst 15 oxidizes the unburned fuel, and raises the exhaust gas temperature.

The DPF 16 is an example of a filter according to the present invention, and has, for example, a number of cells defined by porous partition walls arranged in a flowing direction of the exhaust gas. The upstream side and the downstream side of these cells are alternately plugged. The DPF 16 collects PM of the exhaust gas in the small cavities of the partition walls and on the surfaces of the partition walls. Upon the amount of accumulated PM reaching a predetermined amount, a so-called forced regeneration for burning and removing the PM is executed. The forced regeneration is performed by supplying unburned fuel (primarily HC) to the oxidation catalyst 15 from the in-pipe injection device 13 or through post-injection and by raising the temperature of the DPF 16 to the PM-burning temperature (e.g., approximately 600 degrees C.) through a rise in the exhaust gas temperature.

The DPF 16 of this embodiment also has a pair of electrodes 17a and 17b that are disposed so as to oppose each other with at least one partition wall interposed therebetween. The electrodes 17a and 17b form a capacitor. The electrodes 17a and 17b are electrically connected to the ECU 20, respectively.

The ECU 20 controls fuel injection and other operations of the engine 10 and the in-pipe injection device 13, and includes known CPU, ROM, RAM, input port, output port, and other components. The ECU 20 also includes an electrostatic capacity calculating unit 21 and a regeneration controlling unit 22 as part of its functional elements. The description continues with a premise that these functional elements are included in the ECU 20, which is an integrated hardware piece, but some of these functional elements can be provided in a separate hardware piece.

In this embodiment, the electrostatic capacity calculating unit 21 and the electrodes 17a and 17b constitute the electrostatic capacity detecting unit of the present invention. The regeneration controlling unit 22 and the in-pipe injection device 13 (or a fuel injection device (not shown) of the engine 10) constitute the filter regenerating unit of the present invention.

The electrostatic capacity calculating unit 21 calculates the amount of accumulated PM from an electrostatic capacity C between the pair of electrodes 17a and 17b in order to estimate the amount of accumulated PM in the DPF 16. The electrostatic capacity C is given by the following expression 1, where ε represents the dielectric constant of a medium between the electrodes 17a and 17b, and d represents the distance between the electrodes 17a and 17b. The electrostatic capacity C varies as the dielectric constant ε or the distance d changes with the accumulated PM.

$$C = \varepsilon \times \frac{S}{d}$$ Expression 1

For example, when conductive carbon accumulates between the electrodes 17a and 17b, the distance d between the electrodes 17a and 17b substantially decreases, and the electrostatic capacity C increases. When the accumulation of PM in the medium between the electrodes 17a and 17b progresses, the dielectric constant ε increases, and the electrostatic capacity C increases accordingly. In other words, a proportional relation is present between the electrostatic capacity C and the amount of accumulated PM, and thus the amount of accumulated PM can easily be estimated by calculating the electrostatic capacity C. In this manner, the electrostatic capacity C is used to estimate the amount of accumulated PM in this embodiment. Therefore, the estimation accuracy can be improved in this embodiment, as compared to using a differential pressure sensor whose sensitivity decreases in the last stage of a forced regeneration.

The regeneration controlling unit 22 controls the forced regeneration of the DPF 16 on the basis of the electrostatic capacity C calculated by the electrostatic capacity calculating unit 21. Specific contents of the control will be described with reference to FIGS. 2 and 3.

Figure 2:
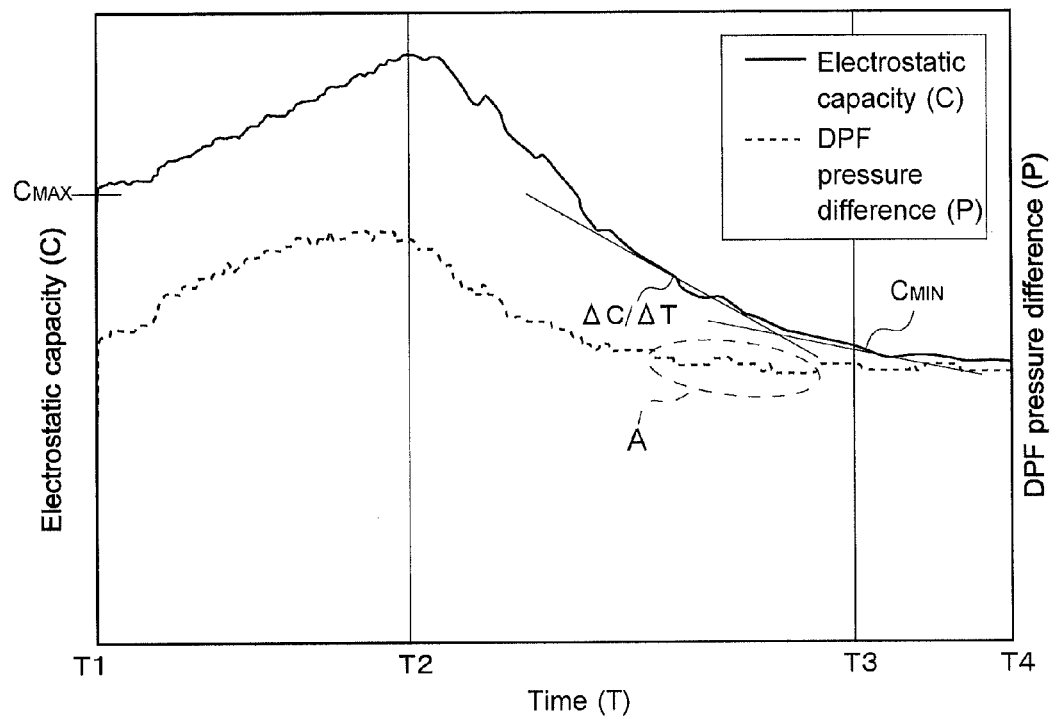
FIG. 2 illustrates changes in the electrostatic capacity and in the pressure difference across a DPF during a forced regeneration by the exhaust gas purification device for the internal combustion engine according to the embodiment of the present invention.
Figure 3A:
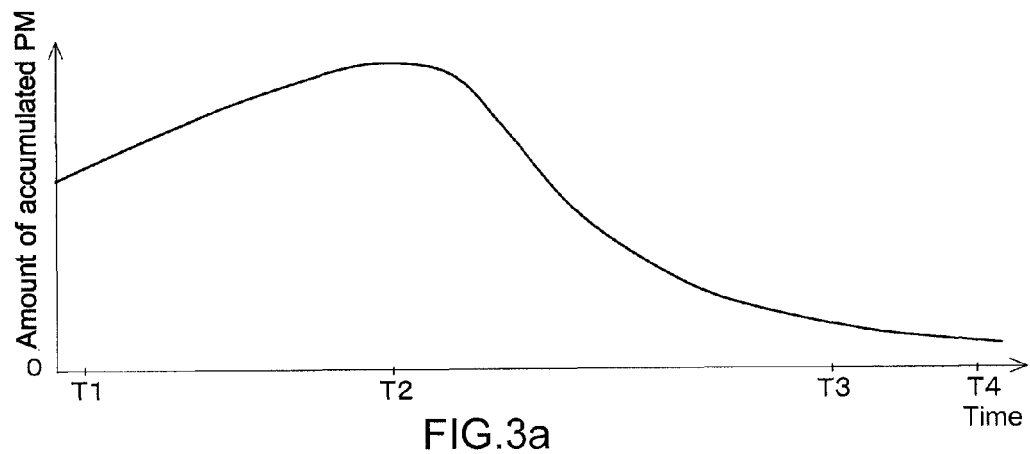
FIG. 3a illustrates a change in the amount of accumulated PM during a forced regeneration by the exhaust gas purification device for the internal combustion engine according to the embodiment of the present invention.
Figure 3B:
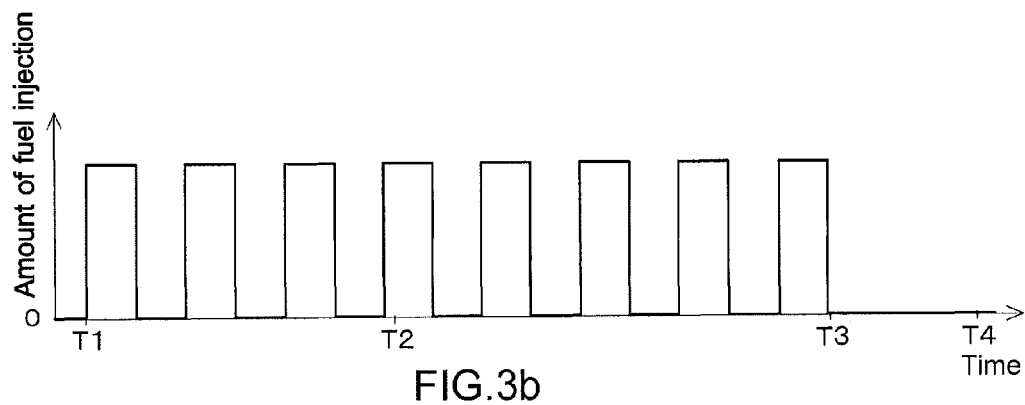
FIG. 3b shows an instruction signal for stopping fuel injection when the regeneration efficiency drops during the forced regeneration.

Firstly, the control of starting a forced regeneration will be described. The ECU 20 stores the electrostatic capacity C corresponding to a maximum accumulation amount of PM that can be collected by the DPF 16 as an upper threshold $C_{MAX}$. The maximum accumulation amount of PM that can be collected by the DPF 16 is obtained in advance through an experiment or the like. As the electrostatic capacity C calculated by the electrostatic capacity calculating unit 21 exceeds the upper threshold $C_{MAX}$ (see time T1 in FIG. 2), the regeneration controlling unit 22 generates (outputs) an instruction signal that causes the in-pipe injection device 13 (the fuel injection device of the engine 10 in the case of post-injection) to inject a prescribed amount of fuel (see time T1 in FIG. 3b). This instruction signal is generated continually at predetermined intervals until control of ending the forced regeneration starts, which will be described later. In FIGS. 2 and 3, the time T2 indicates the time at which the temperature of the DPF 16 is raised to the PM-burning temperature (e.g., 600 degrees C.) through a rise in the exhaust gas temperature, and the accumulated PM starts burning.

The control of ending the forced regeneration will be described. In the forced regeneration, when the amount of accumulated PM decreases to a predetermined amount, PM does not burn any further even if fuel injection is continued, and the burning efficiency of PM (hereinafter, referred to as regeneration efficiency) significantly drops. If fuel injection is continued in this state, the regeneration efficiency corresponding to the amount of fuel supply is not attained.

The ECU 20 stores a slope or gradient $\Delta C/\Delta T$ of the electrostatic capacity C (the rate of decrease in the electrostatic capacity C per predetermined period of time), at which the regeneration efficiency starts dropping significantly, as a lower threshold $\Delta C/\Delta T_{MIN}$. The slope $\Delta C/\Delta T$ of the electrostatic capacity C is obtained in advance through an experiment or the like. The regeneration controlling unit 22 calculates an average (running average) of the slope $\Delta C/\Delta T$ of the electrostatic capacity C on the basis of the electrostatic capacity C calculated by the electrostatic capacity calculating unit 21. As the slope $\Delta C/\Delta T$ reaches or falls below the lower threshold $\Delta C/\Delta T_{MIN}$ (see time T3 in FIG. 2), the regeneration controlling unit 22 stops the instruction signal for fuel injection (see time T3 in FIG. 3b). Thus, after the regeneration efficiency of the DPF 16 drops, unnecessary fuel supply is suppressed, and the fuel efficiency is effectively improved.

Figure 3C:
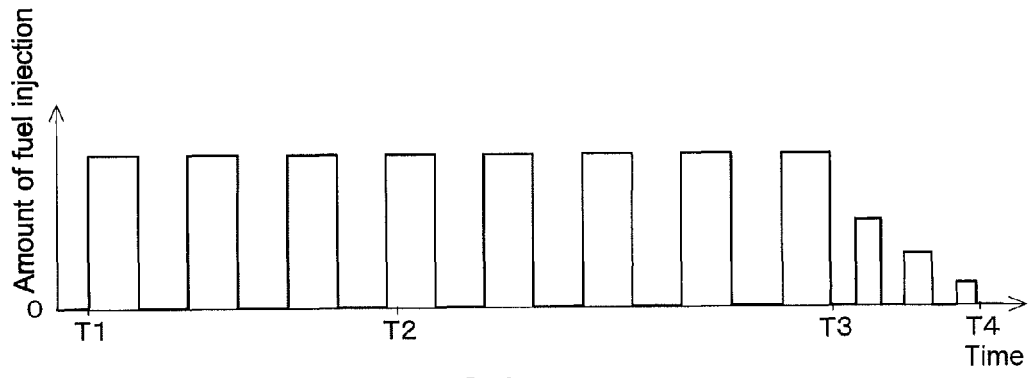
FIG. 3c is a timing chart of an instruction signal for reducing the amount of fuel injection stepwise when the regeneration efficiency drops during the forced regeneration.

It should be noted that as illustrated in FIG. 3c, after the slope $\Delta C/\Delta T$ of the electrostatic capacity C has reached or fallen below the lower threshold $\Delta C/\Delta T_{MIN}$, the amount of fuel injection may be reduced stepwise (see times T3 to T4 in FIG. 3c). In this configuration, the reduced amount of fuel injection or the timing of ceasing the fuel injection may be set to an optimum value in accordance with the capacity of the DPF 16 or other factors.

Figure 4:
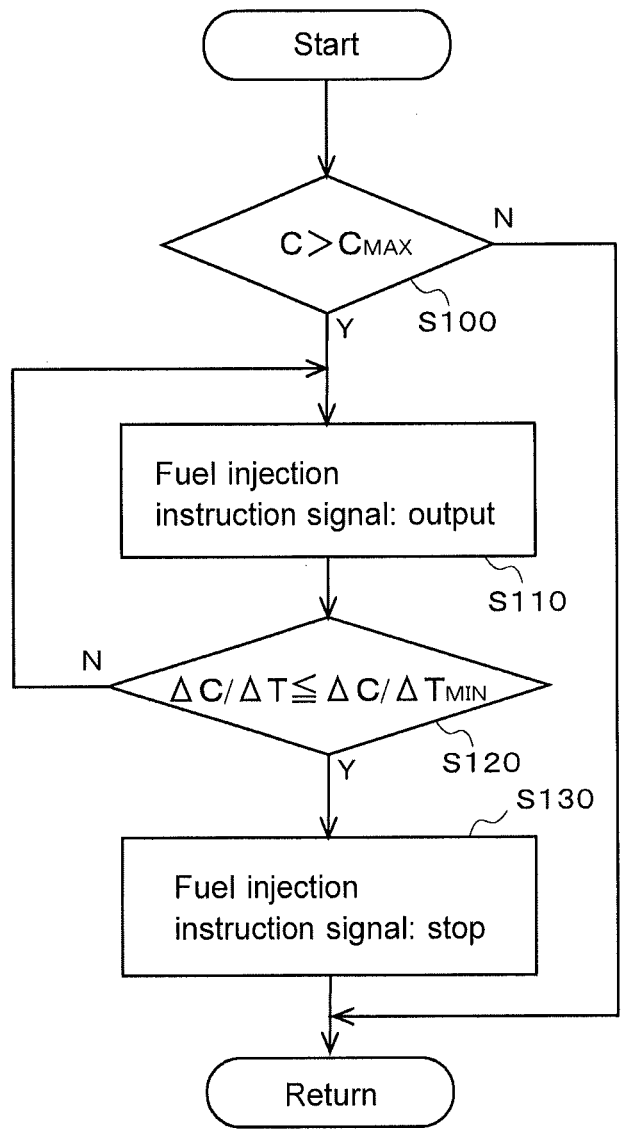
FIG. 4 is a flowchart illustrating the content of control by the exhaust gas purification device for the internal combustion engine according to the embodiment of the present invention.

Referring now to FIG. 4, a control process of the exhaust gas purification device according to the embodiment of the present embodiment will be described. This control starts upon turning on of an ignition key.

At step 100 (hereinafter, "step" is simply indicated as S), it is determined whether the electrostatic capacity C, which is proportional to the amount of accumulated PM, has exceeded the upper threshold $C_{MAX}$, which corresponds to the maximum accumulation amount of PM. If the electrostatic capacity C has exceeded the upper threshold $C_{MAX}$ (C>$C_{MAX}$), the control proceeds to S110. On the other hand, if the electrostatic capacity C is equal to or less than the upper threshold $C_{MAX}$(C≤$C_{MAX}$), the control proceeds to "Return."

At S110, to start a forced regeneration, an instruction signal is generated that causes the in-pipe injection device 13 (the fuel injection device of the engine 10 in the case of post-injection) to inject a predetermined amount of fuel. Thereafter, the temperature of the DPF 16 is raised to the PM-burning temperature (e.g., approximately 600 degrees C.), and PM that has accumulated in the DPF 16 starts burning.

At S120, it is determined whether the slope $\Delta C/\Delta T$ of the electrostatic capacity C (the decreasing rate of the electrostatic capacity C per predetermined period of time) has reached the lower threshold $\Delta C/\Delta T_{MIN}$, which indicates a drop in the regeneration efficiency. If the slope $\Delta C/\Delta T$ has reached or fallen below the lower threshold $\Delta C/\Delta T_{MIN}$ ($\Delta C/\Delta T \leq C_{MIN}$), the control proceeds to S130. On the other hand, if the slope $\Delta C/\Delta T$ is greater than the lower threshold $\Delta C/\Delta T_{MIN}$ ($\Delta C/\Delta T > C_{MIN}$), the control returns to S110. In other words, fuel injection from the in-pipe injection device 13 (or post-injection) continues.

At S130, to suppress unnecessary fuel consumption, the instruction signal that causes the in-pipe injection device 13 (the fuel injection device of the engine 10 in the case of post-injection) to inject fuel is stopped, or the amount of fuel injection is reduced stepwise. Then, the control proceeds to "Return." Thereafter, S100 to S130 are reiterated until the ignition key is turned off.

Advantages of the exhaust gas purification device for an internal combustion engine according to this embodiment will be described.

In a conventional forced regeneration, the starting time and the ending time are controlled on the basis of the pressure difference, which is detected by a differential pressure sensor, across the DPF between the upstream side and the downstream side of the exhaust passage. As burning of PM progresses through the forced regeneration, the pressure difference across the DPF between the upstream side and the downstream side of the exhaust passage gradually decreases, and the sensitivity of the remaining PM to the pressure difference tends to decrease in particular in the last stage of the forced regeneration (e.g., see region A in FIG. 2). Thus, an accurate amount of PM remaining in the DPF cannot be grasped. Therefore, it has been necessary to set the safety factor with a large margin and increase the amount of fuel supply or to reduce the regeneration interval.

On the other hand, the exhaust gas purification device of this embodiment estimates the amount of accumulated PM on the basis of the electrostatic capacity C with good sensitivity even in the last stage of a forced regeneration, and stops the fuel injection as the slope $\Delta C/\Delta T$ of the electrostatic capacity C becomes equal to or smaller than the lower threshold $\Delta C/\Delta T_{MIN}$. The lower threshold $\Delta C/\Delta T_{MIN}$ indicates a drop in the regeneration efficiency. In other words, the timing at which the regeneration efficiency relative to the amount of fuel injection notably drops is grasped with accuracy on the basis of the electrostatic capacity C with good sensitivity, and the forced regeneration is finished reliably when the regeneration efficiency drops.

Accordingly, the exhaust gas purification device of this embodiment can suppress unnecessary fuel consumption due to a forced regeneration, and can effectively improve the fuel efficiency. In addition, because an accurate amount of remaining PM is grasped toward the end of the forced regeneration (in the last stage of the forced regeneration), the amount of fuel injection need not be set with a margin, and the regeneration intervals can be set long.

It is to be noted that the present invention is not limited to the above-described embodiment, and appropriate changes and modifications may be made to the above-described embodiment without departing from the scope and spirit of the present invention.

Figure 5:
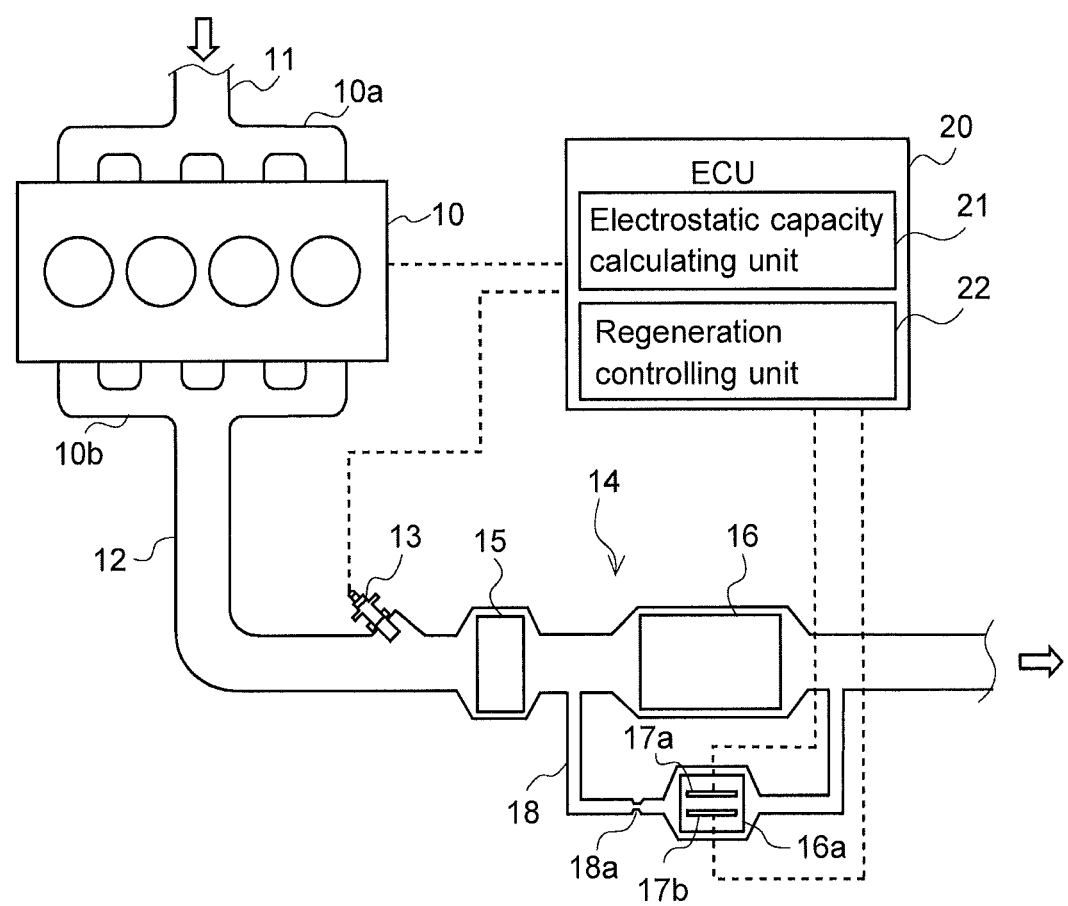
FIG. 5 is an overall configuration diagram schematically illustrating an exhaust gas purification device for an internal combustion engine according to another embodiment.

For example, as illustrated in FIG. 5, a bypass passage 18 may be connected to the exhaust passage 12 to bypass the DPF 16, and a DPF 16a for measurement (second filter) with a small capacity may be provided in the bypass passage 18. In this configuration, a pair of electrodes 17a and 17b may be disposed in the measurement DPF 16a such that the electrodes 17a and 17b oppose each other with at least one partition wall interposed between the electrodes 17a and 17b, and an orifice (throttle) 18a may be provided in the bypass passage 18 for regulating the flow rate of the exhaust gas. In addition, when a forced regeneration of the measurement DPF 16a is performed, an electric current may be applied to the electrodes 17a and 17b to cause the electrodes 17a and 17b to function as a heater.

What is claimed is:

1. An exhaust gas purification device for an internal combustion engine, comprising:
   a first filter that is provided in an exhaust passage of the internal combustion engine and configured to collect particulate matter included in an exhaust gas;
   an electrostatic capacity detector configured to detect an electrostatic capacity of the first filter; and
   a processor configured to
      control supply of an amount of fuel to the first filter to perform a forced regeneration that burns and removes the particulate matter accumulated in the first filter, and
      when a decreasing rate of the detected electrostatic capacity per predetermined period of time reaches or falls below a predetermined lower threshold while the forced regeneration is being performed, said predetermined lower threshold indicating a drop in burning efficiency of the particulate matter, reduce stepwise the amount of fuel supplied to the first filter to zero to end the forced regeneration.

2. The exhaust gas purification device for an internal combustion engine according to claim 1, wherein the electrostatic capacity detector includes a pair of electrodes in the first filter to oppose each other with at least one partition wall interposed between the pair of electrodes, said pair of electrodes forming a capacitor.

3. The exhaust gas purification device for an internal combustion engine according to claim 1, further comprising:
   a bypass passage that branches from the exhaust passage at a position upstream of the first filter and connects to the exhaust passage at a position downstream of the first filter so as to bypass the first filter; and
   a second filter that is provided in the bypass passage and is configured to collect particulate matter in an exhaust gas flowing through the bypass passage,
   wherein the electrostatic capacity detector includes a pair of electrodes disposed in the second filter to oppose each other with at least one partition wall interposed between the pair of electrodes.

4. The exhaust gas purification device for an internal combustion engine according to claim 3, wherein, when a forced regeneration of the second filter is performed, the pair of electrodes function as a heater.

5. The exhaust gas purification device for an internal combustion engine according to claim 3, wherein a capacity of the second filter is smaller than a capacity of the first filter.

6. The exhaust gas purification device for an internal combustion engine according to claim 3 further comprising an orifice disposed in the bypass passage for adjusting a flow rate of the exhaust gas flowing through the bypass passage.

7. The exhaust gas purification device for an internal combustion engine according to claim 1, wherein the internal combustion engine is a diesel engine.

8. The exhaust gas purification device for an internal combustion engine according to claim 7, wherein the first filter is a diesel particulate filter.

* * * * *